(12) United States Patent
Xu

(10) Patent No.: US 10,057,294 B2
(45) Date of Patent: *Aug. 21, 2018

(54) CLOUD-BASED SECURITY POLICY CONFIGURATION

(71) Applicant: Fortinet, Inc., Sunnyvale, CA (US)

(72) Inventor: Qing Xu, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/154,597

(22) Filed: May 13, 2016

(65) Prior Publication Data

US 2016/0261639 A1 Sep. 8, 2016

Related U.S. Application Data

(63) Continuation of application No. 14/500,678, filed on Sep. 29, 2014, now Pat. No. 9,413,724, which is a (Continued)

(51) Int. Cl.
*H04L 29/00* (2006.01)
*H04L 29/06* (2006.01)
*H04L 29/08* (2006.01)

(52) U.S. Cl.
CPC .......... *H04L 63/20* (2013.01); *H04L 63/0272* (2013.01); *H04L 63/0823* (2013.01); (Continued)

(58) Field of Classification Search
CPC ..... H04L 67/10; H04L 63/08; H04L 63/0272; H04L 63/20
See application file for complete search history.

(56) References Cited

U.S. PATENT DOCUMENTS 7,689,722 B1 3/2010 Timms et al.
7,720,995 B2 5/2010 Wainner et al.
(Continued)

OTHER PUBLICATIONS

Non-Final Rejection for U.S. Appl. No. 14/714,103 dated Feb. 9, 2017.
(Continued)

*Primary Examiner* — Brandon S Hoffman
*Assistant Examiner* — Helai Salehi
(74) *Attorney, Agent, or Firm* — Hamilton, DeSanctis & Cha LLP

(57) ABSTRACT

Systems and methods for configuring security policies based on security parameters stored in a public or private cloud infrastructure are provided. According to one embodiment, security parameters associated with a first network security device of an enterprise are shared by the first network security device with other network security devices associated with the enterprise by logging into an shared enterprise cloud account. The shared security parameters are retrieved by a second network security device by logging into the shared enterprise cloud account. A Virtual Private Network (VPN) client configuration is automatically created by the second network security device that controls a VPN connection between the first and second network security devices based at least in part on the shared security parameters. The VPN connection between the first and second network security devices is dynamically established based at least in part on the shared security parameters.

14 Claims, 6 Drawing Sheets

Related U.S. Application Data continuation of application No. 13/759,392, filed on Feb. 5, 2013, now Pat. No. 9,060,025.

(52) U.S. Cl.
CPC .............. *H04L 63/10* (2013.01); *H04L 67/10* (2013.01); *H04L 63/08* (2013.01)

(56) References Cited

U.S. PATENT DOCUMENTS

| | | | |
|---|---|---|---|
| 8,464,335 B1* | 6/2013 | Sinha | G06F 21/51 |
| | | | 713/153 |
| 9,060,025 B2 | 6/2015 | Xu | |
| 9,413,724 B2 | 8/2016 | Xu | |
| 9,825,992 B2 | 11/2017 | Xu | |
| 2008/0307710 A1 | 12/2008 | Wainner et al. | |
| 2010/0169497 A1* | 7/2010 | Klimentiev | G06F 9/546 |
| | | | 709/228 |
| 2010/0217850 A1 | 8/2010 | Ferris | |
| 2010/0325422 A1 | 12/2010 | Gnanasambandam et al. | |
| 2011/0261828 A1* | 10/2011 | Smith | H04L 12/462 |
| | | | 370/401 |
| 2011/0289134 A1 | 11/2011 | de los Reyes et al. | |
| 2013/0042115 A1 | 2/2013 | Sweet et al. | |
| 2014/0223507 A1 | 8/2014 | Xu | |
| 2015/0058917 A1 | 2/2015 | Xu | |
| 2015/0249644 A1 | 9/2015 | Xu | |

OTHER PUBLICATIONS

Non-Final Rejection for U.S. Appl. No. 13/759,392 dated Aug. 15, 2014.

Notice of Allowance for U.S. Appl. No. 13/759,392 dated May 8, 2015.

Non-Final Rejection for U.S. Appl. No. 14/500,678 dated Mar. 10, 2016.

Non-Final Rejection for U.S. Appl. No. 14/714,103 dated Jul. 28, 2016.

Notice of Allowance for U.S. Appl. No. 14/500,678 dated Jun. 22, 2016.

Final Rejection for U.S. Appl. No. 14/714,103 dated Jun. 1, 2017.

Notice of Allowance for for U.S. Appl. No. 14/714,103 dated Aug. 24, 2017.

* cited by examiner

CLOUD-BASED SECURITY POLICY CONFIGURATION

CROSS-REFERENCE TO RELATED APPLICATIONS

This application is a continuation of U.S. patent application Ser. No. 14/500,678, filed Sep. 29, 2014, now U.S. Pat. No. 9,413,724, which is a continuation of U.S. patent application Ser. No. 13/759,392, filed Feb. 5, 2013, now U.S. Pat. No. 9,060,025, both which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

BACKGROUND

Field

Embodiments of the present invention generally relate to computer networking. In particular, embodiments of the present invention relate to achieving security and/or flexibility in networking systems by maintaining security parameters for security devices in the cloud to facilitate dynamic creation of appropriate security policies on peer security devices in support of desired security services, for example.

Description of the Related Art

Computer networks used by large business enterprises generally consist of a network of networks spread over geographical regions ranging from different buildings to different continents. Each individual network may contain various network appliances such as routers, switches, gateways, firewalls, Wireless Access Points, and can also be considered to include general purpose computing devices such as personal computers, personal digital assistants (PDAs), laptops, printers, among others. Network appliances typically provide ability for electronic devices to communicate and exchange content/information with other remote electronic devices that are spread over geographical regions.

Enterprise customers are now demanding cost-effective, outsourced connectivity and security services, such as Virtual Private Networks (VPNs). A VPN is a private network that takes advantage of public telecommunications (e.g., the Internet) and maintains privacy through use of tunneling protocols and security procedures.

Current VPN setup procedures are complicated, requiring network administrators to perform extensive manual configurations on both peers of the VPN connection before the VPN can be used. For example, if an Internet Protocol Security Protocol (IPSec) VPN needs to be setup between a headquarters network (HQ) and a branch office network, the HQ security device (e.g., a firewall) usually needs to have created therein a firewall address object for the local subnet and a firewall address object for the remote branch subnet. The HQ security device also needs to create an IPSec VPN phase1 object. Creation of the phase1 object typically requires manual input of numerous parameters, such as a remote gateway IP address, a local interface, a VPN mode, a VPN authentication method, a pre-shared key etc. The HQ security device must also create an IPSec VPN phase2 object, which requires manual input of further parameters. Next, the network administrator must creates a firewall policy within the HQ security device using the address objects, the phase1 and phase2 objects and additional parameters. A corresponding procedure must be performed for the branch office security device. The parameters, such as remote gateway IP address, remote subnet and pre-shared key are usually shared by the network administrators of the HQ and branch office networks offline.

The procedure to configure a VPN can be complicated and fallible because many parameters are involved and shared. When communications are needed among multiple sites, VPN configuration procedures are more complicated. For example, if a company has N sites and each site requires manual configuration of 4 firewall objects (2 firewall address objects, and 2 IPSec VPN objects (i.e., phase1 and phase2 objects)) and 1 firewall policy on each firewall for each site-to-site VPN connection, the administrators are required to configure 5×N×(N−1) objects in total for the N-site VPN.

Further, maintenance of all the VPN configurations is also complicated. If either remote gateway IP address or subnet of one of the participating sites is changed, configurations of all related peers that have connections to the changed site have to be manually adjusted in order to maintain full connectivity among the participating sites.

Some technologies seek to address various aspects of the above-illustrated complexities, but they represent only partial solutions. For example, if a peer's firewall IP address is dynamically assigned by a Dynamic Host Configuration Protocol (DHCP) server, a Fully Qualified Domain Name (FQDN) can be used, instead of using its IP address. However, this solution still requires the network administrator to know the peer's FQDN first, and an additional Domain Name System (DNS) entry is needed for this in the DNS server.

If the remote subnets are changed, it is possible to use routing protocols instead of obtaining information regarding the remote subnets offline. But, for routing within private networks, routing protocols have to be run on top of the IPSec VPN tunnels, which in turn require these tunnels to be configured and setup manually in advance. Furthermore, this approach requires the network administrators to have additional knowledge regarding the configuration of routing protocols.

In view of the foregoing, there exists a need for methods and systems that automate one or more aspects of security device parameter configuration and/or creation of appropriate security policies on peer security devices to facilitate more efficient establishment of desired security services.

SUMMARY

Systems and methods are described for configuring security policies based on security parameters stored in a public or private cloud infrastructure. According to one embodiment, security parameters associated with a first network security device of an enterprise are shared by the first network security device with other network security devices associated with the enterprise by logging into an shared enterprise cloud account. The shared security parameters are retrieved by a second network security device of the enterprise by logging into the shared enterprise cloud account. A Virtual Private Network (VPN) client configuration is automatically created by the second network security device that controls a VPN connection between the first network security device and the second network security device based at least in part on the shared security parameters. The VPN connection between the first network security device and the second network security device is dynamically established based at least in part on the shared security parameters.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
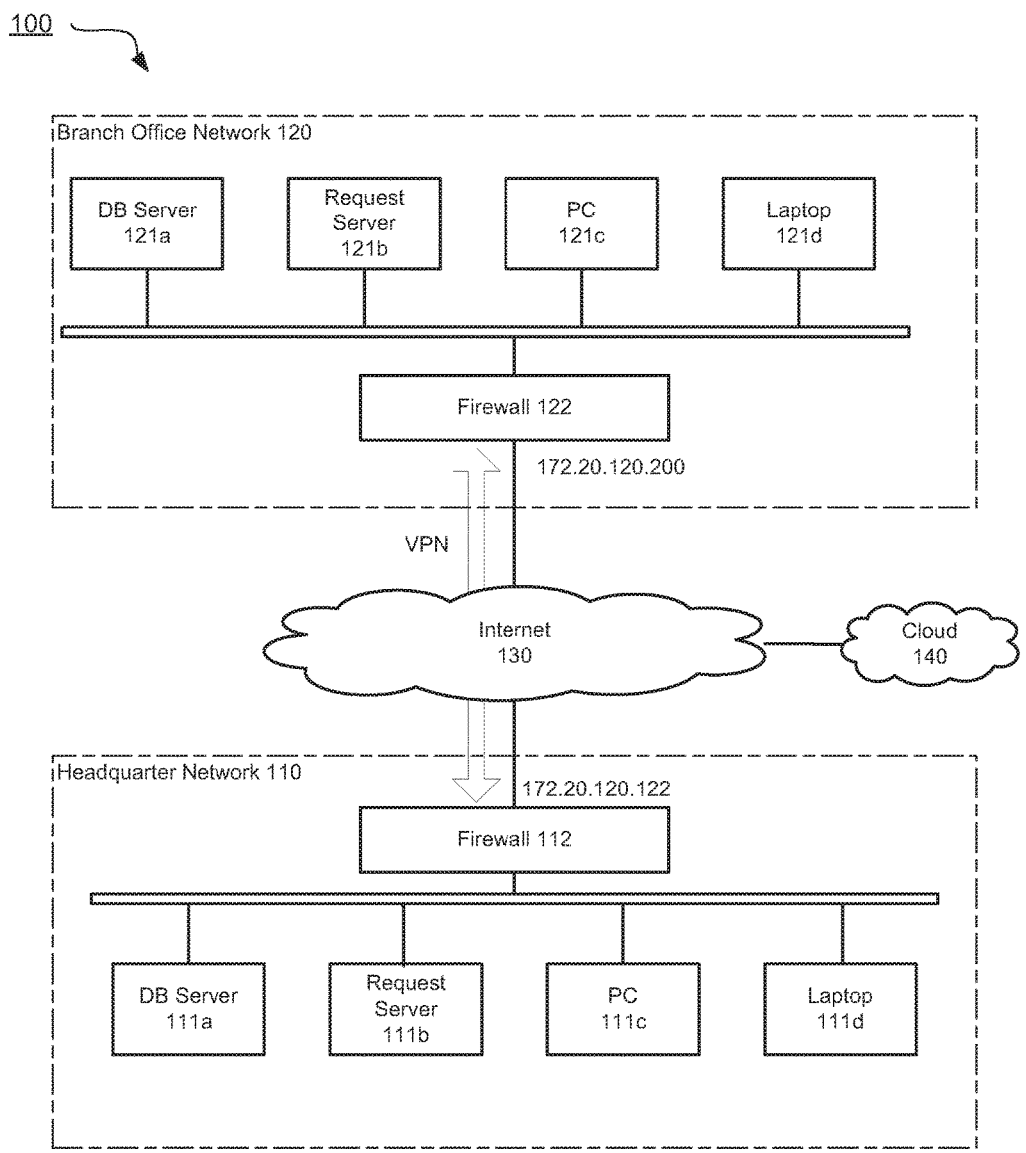
FIG. 1 illustrates an exemplary network architecture in accordance with an embodiment of the present invention.

Systems and methods are described for configuring security policies based on security parameters stored in a public or private cloud infrastructure. Because security policies in a security device are used to control the network activities within a network or between networks, it is important to establish a set of security policies that logically work together. It can be complicated to create and maintain the security policies as numerous parameters are involved and the parameters may change according to the network context. Therefore, in order to simplifying the procedure of creating and maintaining security policies for network appliances, there is a need for methods and systems for configuring security policies based on security parameters stored in the cloud.

According to one embodiment, security devices of an enterprise publish their security parameters to a public or private cloud infrastructure and retrieve security parameters of peer security devices from the cloud thereby enabling automatic establishment of security policies.

According to another embodiment, network appliances share and update their security parameters by way of a cloud account. A first network appliance may fetch one or more security parameters shared by a second network appliance to the cloud account. Then the first network appliance automatically creates a security policy that controls a connection between the first network appliance and the second network appliance based on the security parameters fetched from the cloud. Therefore, the administrator of a network appliance does not need to create and maintain the security policies manually. The procedure of creating and maintaining security policies is simplified and becomes more flexible.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Although embodiments of the present invention are described in the context of VPN setup, it should be appreciated that such embodiments are merely illustrative of one type of security service configuration that may benefit from the methods and systems described herein.

TERMINOLOGY

Brief definitions of terms used throughout this application are given below.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

FIG. 1 is an exemplary network architecture conceptually illustrating a network system 100 having a headquarters network 110 and a branch office network 120. In the present example, both headquarters network 110 and branch office network 120 are connected to a public network, such as Internet 130. A cloud 140 is also connected to Internet 130. As such, cloud 140 can be accessed by the network appliances (e.g., firewall 112 and firewall 122) of headquarters network 110 and branch office network 120 via Internet 130. A VPN connection can be established so that secure communications can be achieved between headquarters network 110 and branch office network 120 via Internet 130.

In the context of the present example, headquarters network 110 includes computing devices, such as database server 111a, request server 111b, personal computer (PC) 111c and laptop 111d. Headquarters network 110 also includes a firewall 112 that may operate as a router and network security or access control mechanism. Firewall 112 may be configured to shield data and resources from computer network intruders and create an electronic boundary that prevents unauthorized users from accessing files or other content on headquarters network 110. In one embodiment, computing devices 111a-d are connected via wired or wireless connections to firewall 112 in order to access Internet 130, cloud 140 or branch office network 120. Similarly, branch office network 120 includes computing devices, such as database server 121a, request server 121b, PC 121c and laptop 121d. Branch office network 120 also includes a firewall 122 and computing devices 121a-d are connected via wired or wireless connections to firewall 122 in order to access Internet 130, cloud 140 or headquarters network 110.

According to one embodiment, firewall 112 and 122 not only includes routing and firewalling functionality, but can also include switching, modem, load balancing, gateways, wireless access point, threat management, hub and/or similar functionality in logical or physical form that provide, among other features, network access control and network security control. Other computer devices within headquarters network 110 and/or branch office network 120 may include smartphones, tablet computers, network attached storage, printers or other web-enabled computing devices that are configured to access Internet 130 through such networking devices mentioned above. Therefore, the scope of network appliances of the present disclosure includes computing devices 111a-d/121a-d and security devices, such as firewall 112/122 among other networking devices. It should also be appreciated that network system 100, as illustrated in FIG. 1, is merely exemplary and embodiments of the present invention are equally applicable to alternative network architectures and/or configurations.

Notably, headquarters network 110 and branch office network 120 can be any type of internal or private network. Those skilled in the art will appreciate that headquarters network 110 and branch office network 120 may be implemented as one of numerous types of networks, such as intranets, local area networks (LAN), wireless LANs (WLAN), virtual LANs (VLAN), or any combination of different types of networks.

In one embodiment, firewalls 112 and 122 can be configured to allow authorized users to access files or other resources within their respective networks 110 and 120 or within network system 100. According to one embodiment, some computing devices of headquarters network 110, such as DB server 111a and request server 111b, are allowed to be accessed from PC 121c and laptop 121d of branch office network 120. Likewise, DB server 121a and request server 121b, may be allowed to be accessed from PC 111c and laptop 111d of headquarters network 110. Typically, a VPN tunnel is established between firewall 112 and firewall 122 to ensure communications among computing devices 112a-d/122a-d are secure.

In order to share resources of DB server 111a and request server 111b of headquarters network 110 with PC 121c and laptop 121d of branch office network 120, security policies are established within both firewall 112 and firewall 122 that allow network traffic to be exchanged between these network appliances. Prior to configuring existing firewalls, security parameters, such as remote gateway IP address, remote subnet and VPN pre-shared key, are typically exchanged offline between network administrators of the two networks. Several network firewall objects and policies are manually established by the network administrators within firewalls 112 and 122. In contrast, in accordance with embodiments of the present invention, security policies may be established automatically and dynamically by using cloud 140 as an intermediary through which security parameters may be shared among peers.

According to one embodiment, each security device can login to the same cloud account within cloud 140 to share its security parameters with peers via cloud 140. Each security device may also fetch from cloud 140 the security parameters shared by other security devices. These parameters can include, but are not limited to, share-account, gateway IP address, subnet, VPN mode, VPN authentication method, VPN pre-shared key, VPN certificate, share-to-account and share-to-subnet. The "share-account" parameter identifies the present local network that shares its resources. In one embodiment, each local network has a unique "share-account." In another embodiment, all local networks of the same entity can have the same "share account" while local networks belonging to different entities can each have a different "share account." The "gateway IP address" parameter identifies the IP address of a gateway associated with the local network to be used. The "subnet" parameter identifies IP addresses of the network appliances of a local network that are allowed to be accessed from remote network appliances. "VPN mode", "VPN authentication method", "VPN pre-shared key" and "VPN certificate" are parameter that are used by the security device to setup a VPN connection. The "share-to-account" parameter identifies a remote network that is allowed by a local network to access its resources. The "share-to-subnet" parameter identifies IP addresses of the remote network appliances that are allowed by a local network to access its resources. Those skilled in the art will appreciate that other parameters that are needed for establishing a connection or configuring a security policy may be shared via cloud 140.

In one embodiment, the security parameters shared by the network appliances via cloud 140 may be organized in a data structure as shown in Table 1.

TABLE 1

| Account | Gateway IP | Subnet | Description | VPN-parameters | Share-to-Account | Share-to-Subnet |
| --- | --- | --- | --- | --- | --- | --- |
| admin@abc.com | 172.20.120.122 | 10.10.10.0/24 | HQ_Net | Main, . . . , etc | admin@abc.com | 192.168.1.0/24 |
| admin@abc.com | 172.20.120.122 | 10.10.10.0/24 | HQ_Net | Main, . . . , etc | admin@abc.com | 192.168.2.0/24 |
| admin@abc.com | 172.20.120.200 | 192.168.1.0/24 | Branch1_Net | Main, . . . , etc | admin@abc.com | 10.10.10.0/24 |
| admin@abc.com | 172.20.120.210 | 192.168.2.0/24 | Branch2_Net | Main, . . . , etc | admin@abc.com | 10.10.10.0/24 |
| admin@abc.com | 172.20.120.220 | 192.168.3.0/24 | Branch3_Net | Main, . . . , etc | none | none |

Each row of Table 1 may correspond to parameters that are needed to establish a connection between two networks. Those skilled in the art will appreciate that various alternative data structures and/or file formats can be used to store and share the parameters at the cloud account, such as a database file, an excel document, plain text, html or xml format. Some or all of the data shared via the cloud account can also be encrypted if desired. For example, the "pre-shared key" may be encrypted and shared via the cloud. It can be decrypted after it is fetched by a participating network appliance.

According to one embodiment, firewall 112 may log in to cloud 140 with an account like "admin@abc.com". This can be done in the background, for example, after firewall 112 boots up. After login, firewall 112 can insert security parameters corresponding to those the first two rows of Table 1. As shown in the first row, headquarters network 110 has an account name "admin@abc.com" and the gateway IP address of headquarters network 110 is 172.20.120.122. The network appliances of subnet 10.10.10.0/24 within headquarters network 110 are allowed to be accessed from branch office network 110. Some VPN parameters are shared so that branch office network 120 may know how to create a VPN tunnel with headquarters network 110. In the present example, headquarters network 110 designates only subnet 192.168.1.0/24 of branch office network 110 is allowed to access headquarters network 110. Other rows can be created and have similar meaning as the first row. Similarly, firewall 122 of branch office network 120 may store its security parameters within cloud 140.

When a network appliance of one network desires to initiate a connection to another network, it can simply fetch appropriate security parameters to do so. For example, if firewall 112 of headquarters network 112 desires to initiate a connection with branch office network 120, it can fetch security parameters associated with firewall 122 from cloud 140. In one embodiment, the content of Table 1 can be cached locally at firewall 112. To simplify the management, several local tables can be created and synchronized with the cloud table by firewall 112. In one embodiment, four local tables, i.e. a "share" table, a "viewable" table, an "access to" table and an "allowed in" table, are created as follows.

"Share" table, as shown in Table 2, is a list of local subnets that are allowed to be accessed from remote networks. The "share" table is created and maintained by the administrator of a local network.

TABLE 2

| Account | Gateway IP | Subnet | Description | VPN-parameters |
|---|---|---|---|---|
| admin@abc.com | 172.20.120.122 | 10.10.10.0/24 | HQ_Net | Main, . . . , etc |

"Viewable" table, as shown in Table 3, is a list of remote networks and subnets that the local network can see. The remote subnets are shared by other remote networks and fetched from the cloud table. It is a subset of the cloud table.

TABLE 3

| Account | Gateway IP | Subnet | Description | VPN-parameters | Share-to-Account | Share-to-Subnet |
|---|---|---|---|---|---|---|
| admin@abc.com | 172.20.120.200 | 192.168.1.0/24 | Branch1_Net | Main, . . . , etc | admin@abc.com | 10.10.10.0/24 |
| admin@abc.com | 172.20.120.210 | 192.168.2.0/24 | Branch2_Net | Main, . . . , etc | admin@abc.com | 10.10.10.0/24 |
| admin@abc.com | 172.20.120.220 | 192.168.3.0/24 | Branch3_Net | Main, . . . , etc | none | none |

"Access to" table, as shown in Table 4, is a list of remote subnets that are actually allowed by the local network to go out. It is a subset of the "viewable" table.

TABLE 4

| Account | Gateway IP | Subnet | Description | VPN-parameters | Share-to-Account | Share-to-Subnet |
|---|---|---|---|---|---|---|
| admin@abc.com | 172.20.120.200 | 192.168.1.0/24 | Branch1_Net | Main, . . . , etc | admin@abc.com | 10.10.10.0/24 |
| admin@abc.com | 172.20.120.210 | 192.168.2.0/24 | Branch2_Net | Main, . . . , etc | admin@abc.com | 10.10.10.0/24 |

"Allowed in" table, as shown in Table 5, is a list of remote subnets that are actually allowed by the local network to come in. It is a subset of the "viewable" table.

TABLE 5

| Account | Gateway IP | Subnet | Description | VPN-parameters | Share-to-Account | Share-to-Subnet |
|---|---|---|---|---|---|---|
| admin@abc.com | 172.20.120.200 | 192.168.1.0/24 | Branch1_Net | Main, . . . , etc | admin@abc.com | 10.10.10.0/24 |
| admin@abc.com | 172.20.120.210 | 192.168.2.0/24 | Branch2_Net | Main, . . . , etc | admin@abc.com | 10.10.10.0/24 |

Although four local tables are described in the context of the present example, those skilled in the art will appreciate security parameters may be organized in various other manners. For example, a local table that is the same as the cloud table can be used to cache the cloud table or it can be split into a number of local tables depending on local settings.

According to one embodiment, firewall 112 can perform a consistency check against a local rule after the security parameters are fetched from the cloud table. If the security parameters shared by the other network are allowable according to the local rule, then a security policy can be created based on these security parameters. It can be seen from Tables 3, branch office networks 1-3 share their resource to remote networks. However, as shown in Table 5, the local administrator (here, the administrator of headquarters network) can restrict the access to branch office networks 1 and 2 only after check the local rule.

Next, firewall 112 automatically creates three firewall address objects, i.e. HQ_Net (10.10.10.0/24), Branch_Net1 (192.168.1.0/24) and Branch_Net2 (192.168.2.0/24) according to Table 2 and Table 5. Firewall 112 also automatically creates two dynamic security policies according to Table 5 as follows. These policies will control traffics between HQ_Net and Branch_Net1/Branch_Net2 to be transferred in a VPN tunnel.

Police Headquarter->Branch1:
    source interface: internal
    destination interface: wan1
    source address: HQ_Net
    destination address: Branch_Net1
    Action: IPSec VPN
    Service: any Police Headquarter->Branch2:
    source interface: internal
    destination interface: wan1
    source address: HQ_Net
    destination address: Branch_Net2
    Action: IPSec VPN
    Service: any Similar operations are also carried out by firewall 122 so that security parameters can be fetched, local tables can be maintained and dynamic policies can be created in the same way as firewall 112.

Next, when firewall 112 receives traffic coming from its local network (10.10.10.0/24) to a destination (192.168.1.0/24), a series of firewall policies can be checked. When automatically created policy "Police Headquarter->Branch1" is matched, firewall 112 checks the cloud table to determine if the traffic is allowable and how to establish the connection. Of course, if the cloud table is cached locally, firewall 112 can check the local table instead.

Next, firewall 112 retrieves the rows in which "Subnet" is the destination (192.168.1.0/24) from the cloud table. In the example as shown in Table 1, only one row is retrieved. Then, "Share-to-Subnet" column of the retrieved row is checked to verify if it contains subnet 10.10.10.0/24. If "Share-to-Subnet" column does not contain subnet 10.10.10.0/24, it means that the traffic is not allowed by the remote network. As a result, the traffic is denied. If "Share-to-Subnet" column does contain subnet 10.10.10.0/24, firewall 112 retrieves the gateway IP address of the remote (172.20.120.200) at column "Gateway IP". Connection establishing module 260 also retrieves VPN parameters if VPN is needed for the traffic. Then, firewall 112 initiates an IPSec tunnel request to "Gateway IP" (172.20.120.200). Firewall 122 of branch office network 120 receives the VPN request and checks the VPN initiator's IP (172.20.120.122) in cloud table. When firewall 122 finds out the VPN initiator's IP is from headquarters network 110 and is in its "share-to-account" of the cloud table, a VPN tunnel can be setup between the two firewalls. When the VPN tunnel is setup, traffic exchanged between headquarters network 110 and branch office network 120 will flow through the VPN tunnel.

According to one embodiment, firewall 112 can update its parameters in the cloud table if the parameters have been changed locally. For example, the "Gateway IP" may be assigned by a DHCP server and may be changed after some times. The "subnet" may also be changed when some resources of a local network are newly allowed/disallowed to be shared according to the local rule. When these parameters are changed, both the local table and the cloud table may be updated.

Further, firewall 112 can check the modifications of security parameters in the cloud table periodically or at the time when traffic is arriving. If any parameter in the cloud table is updated by other networks, firewall 112 can synchronize it with its local table. Firewall 112 can automatically create a new security policy or update or delete the automatically created security policy according to the updates of the parameter.

According to one embodiment, firewall 112 further sends a keepalive command to the cloud 140 so that the cloud account is always online. This will help firewall 112 to randomly check the cloud table when traffic arrives or periodically check the updates of security parameters in cloud table.

Figure 2:
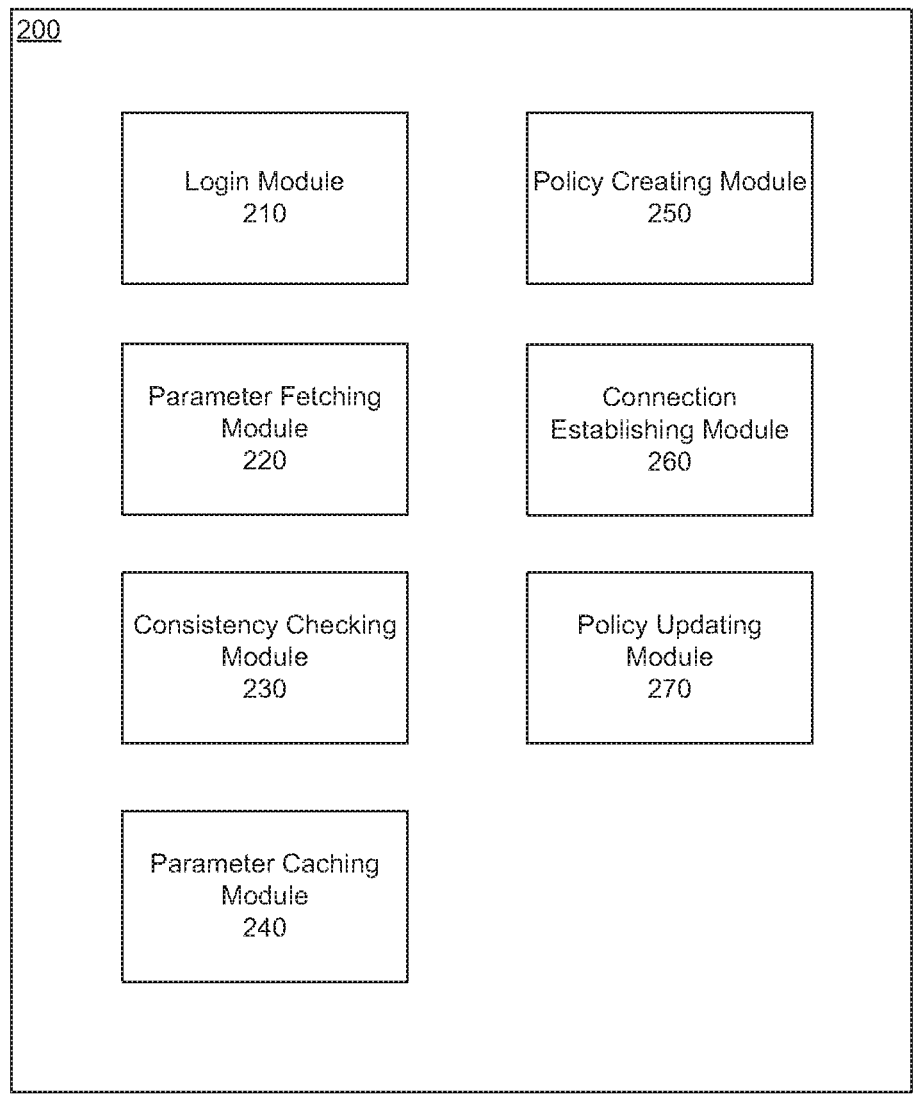
FIG. 2 illustrates exemplary functional units of a network appliance in accordance with an embodiment of the present invention.

FIG. 2 illustrates exemplary functional modules of network appliance 200 in accordance with an embodiment of the present invention. As the structure and function of the processor(s) and communication interface device(s) of network appliance 200 are well known, for sake of brevity, they are not illustrated in FIG. 2. Network appliance 200 may comprise of one or more processors that are operatively coupled with internal memory of appliance 200 to access functional modules and content stored in memory and execute instructions implemented in functional modules to generate desired results. As illustrated in FIG. 2, network appliance 200 includes a login module 210, a parameter fetching module 220, a consistency checking module 230, a parameter caching module 240, a policy creating module 250, a connection establishing module 260 and a policy updating module 270.

Login module 210 is configured to establish a connection between a firewall and a cloud. In one embodiment, each firewall of the same entity can log in to the cloud with the same account, such as "admin@abc.com", while firewalls of different entities can log in to the cloud with different accounts, such as "admin@partner.com". In another embodiment, each firewall can login with a unique account.

In one embodiment, logging in to the cloud account can be done in the background once the firewalls boot up or at the time when traffic is arriving. According to one embodiment, login module 210 further sends a keepalive command to the cloud so that the cloud account is always online. This will help the firewalls to randomly check the cloud table when traffic arrives or periodically check the updates of security parameters in cloud table.

Parameter fetching module 220 is configured to fetch security parameters that are shared by network appliances from the cloud. In one embodiment, parameters shared by all the security devices at the cloud can be fetched. For example, all the content of Table 1 can be fetched by the firewall. In another embodiment, only a subset of parameters that is shared with the firewall are fetched. For example, only records that have the account id admin@abc.com in the "shared-to" column can be fetched. Further, if any fetched parameter is encrypted, it can be decrypted locally.

Notably, it is possible that the cloud table is well established by sharing all the correct parameters of security devices. The cloud table can be created and maintained by a network administrator manually so that all the necessary parameters can be shared among all firewalls. Therefore, security devices can trust the cloud table and create its security policies directly after fetching the necessary parameters from the cloud table. However, if the parameters shared on the cloud table comprise errors, the security policies created based on the parameters in the cloud table may be unsafe. Therefore, each security device can maintain its own internal rules and perform a consistency checking before automatically create security policies based on the shared parameters so that errors in the cloud table will not affect the local security.

According to one embodiment, consistency checking module 230 can perform a consistency check against a local rule. If the security parameters shared by the other networks are allowable according to the local rule, then the security policy can be created based on these security parameters.

In one embodiment, the cloud table is initially created and updated under the control of consistency checking module 230. During an initial stage, the consistency checking module 230 of each firewall shares its initial security parameters, such as gateway IP, subnet, to the cloud but does not allow any external access. Therefore, during the initial stage, the cloud table has "none" value in the "share-to" column as shown in Table 6.

TABLE 6

| Account | Gateway IP | Subnet | Description | VPN-parameters | Share-to-Account | Share-to-Subnet |
|---|---|---|---|---|---|---|
| admin@abc.com | 172.20.120.122 | 10.10.10.0/24 | HQ_Net | Main, . . . , etc | none | none |
| admin@abc.com | 172.20.120.200 | 192.168.1.0/24 | Branch1_Net | Main, . . . , etc | none | none |
| admin@abc.com | 172.20.120.210 | 192.168.2.0/24 | Branch2_Net | Main, . . . , etc | none | none |
| admin@abc.com | 172.20.120.220 | 192.168.3.0/24 | Branch3_Net | Main, . . . , etc | none | none |

After the initial security parameters are fetched from the cloud by parameter fetching module 220, consistency checking module 230 compares all the viewable networks with a local rule. If a viewable network matches with the local rule, it means that a remote network shares its resources while the local network accepts this sharing. In other embodiments, a list of viewable networks can be shown to the network administrator, and the allowed networks can be selected by the administrator from the list. It can be seen from Table 6, branch office networks 1-3 share their resources to remote networks. However, the local administrator (here, the administrator of headquarters network) can select only branch office networks 1 and 2 be allowed.

Next, consistency checking module 230 lists the matched or selected remote networks and subnets thereof at the "share-to-account" and "share-to-subnet" columns of the cloud table. After every consistency checking module 230 of the network completes its processing, the cloud tables are updated and Table 6 becomes Table 1.

Parameter caching module 240 is configured to cache the fetched parameters locally. To simplify the management, one or more local tables can be created by parameter caching module 230. In one embodiment, four local tables, i.e. "share" table, "viewable" table, "access to" table and "allowed in" table are created and the cloud table can be split and cached in the corresponding local tables. Although four local tables are listed in above embodiment, those skilled in the art will appreciate that a local table can be the same as the cloud table or be split to other number of tables depend on local settings.

Policy creating module 250 is configured to automatically create a security policy that controls the connection between local networks and remote networks based on the parameters of the cloud table or local table. In one embodiment, policy creating module 250 also creates firewall address objects based on the parameters of the cloud table or local table. The security policies may include following items:

Police Headquarter->Branch1:
  source interface: internal
  destination interface: wan1
  source address: HQ_Net
  destination address: Branch_Net1
  Action: IPSec VPN
  Service: any Police Headquarter->Branch2:
  source interface: internal
  destination interface: wan1
  source address: HQ_Net
  destination address: Branch_Net2
  Action: IPSec VPN
  Service: any Connection establishing module 260 is configured to establish a connection between the local network and a remote network if network traffic is allowed by security policies. In one embodiment, when connection establishing module 260 receives traffic coming from its local network (10.10.10.0/24) to a destination (192.168.1.0/24), a series of firewall policies will be checked. When the automatically created policy "Police Headquarter->Branch1" is matched, connection establishing module 260 further checks the cloud table to determine if the traffic is allowable and how to establish the connection. Of course, if the cloud table is cached locally, local table, instead of the cloud table, can be used.

Connection establishing module 260 retrieves the rows in which "Subnet" is the destination (192.168.1.0/24) from the cloud table. Then, "Share-to-Subnet" column of the retrieved rows is checked to verify if it contains source subnet 10.10.10.0/24. If "Share-to-Subnet" column does not contain subnet 10.10.10.0/24, it means that the traffic is not allowed by the remote network. Then, the traffic is denied. If "Share-to-Subnet" column does contain subnet 10.10.10.0/24, connection establishing module 260 retrieves the gateway IP address of the remote (172.20.120.200) at column "Gateway IP". Connection establishing module 260 also retrieves VPN parameters if VPN is need for the traffic. Then, connection establishing module 260 initiates IPSec tunnel request to "Gateway IP" (172.20.120.200). Connection establishing module 260 of the destination network receives the VPN request and checks VPN initiator's IP (172.20.120.122) in cloud table. When connection establishing module 260 of the destination network finds out that the VPN initiator's IP is in its "share-to-account" of the cloud table, a VPN tunnel can be setup between the two firewalls. When the VPN tunnel is setup, the traffic will flow through.

Policy updating module 270 is configured to update its parameters in the cloud table if the parameters have been changed locally. For example, the "Gateway IP" may be assigned by a DHCP server and may be changed after some times. The "subnet" can also be changed when some resources of a network are newly allowed/disallowed to be shared according to the local rule. When these parameters are changed, both local table and cloud table should be updated by policy updating module 270.

Further, policy updating module 270 can check the updates in the cloud table periodically or at the time when traffic is arriving. If any parameter in the cloud table is updated by other networks, the firewall can synchronize it with its local table. The firewall can automatically create a new security policy or update/delete the previously created security policy according to the updates of the parameter.

Depending upon the particular implementation, the functionality of one or more of the above-referenced functional units may be merged in various combinations or distributed across additional functional units. For example, parameter fetching module 220 and connection establishing module 260 may be combined. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

According to embodiments of the invention, the functional units can be any suitable type of logic (e.g., digital logic, software code and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media or flash memory devices.

Figure 3:
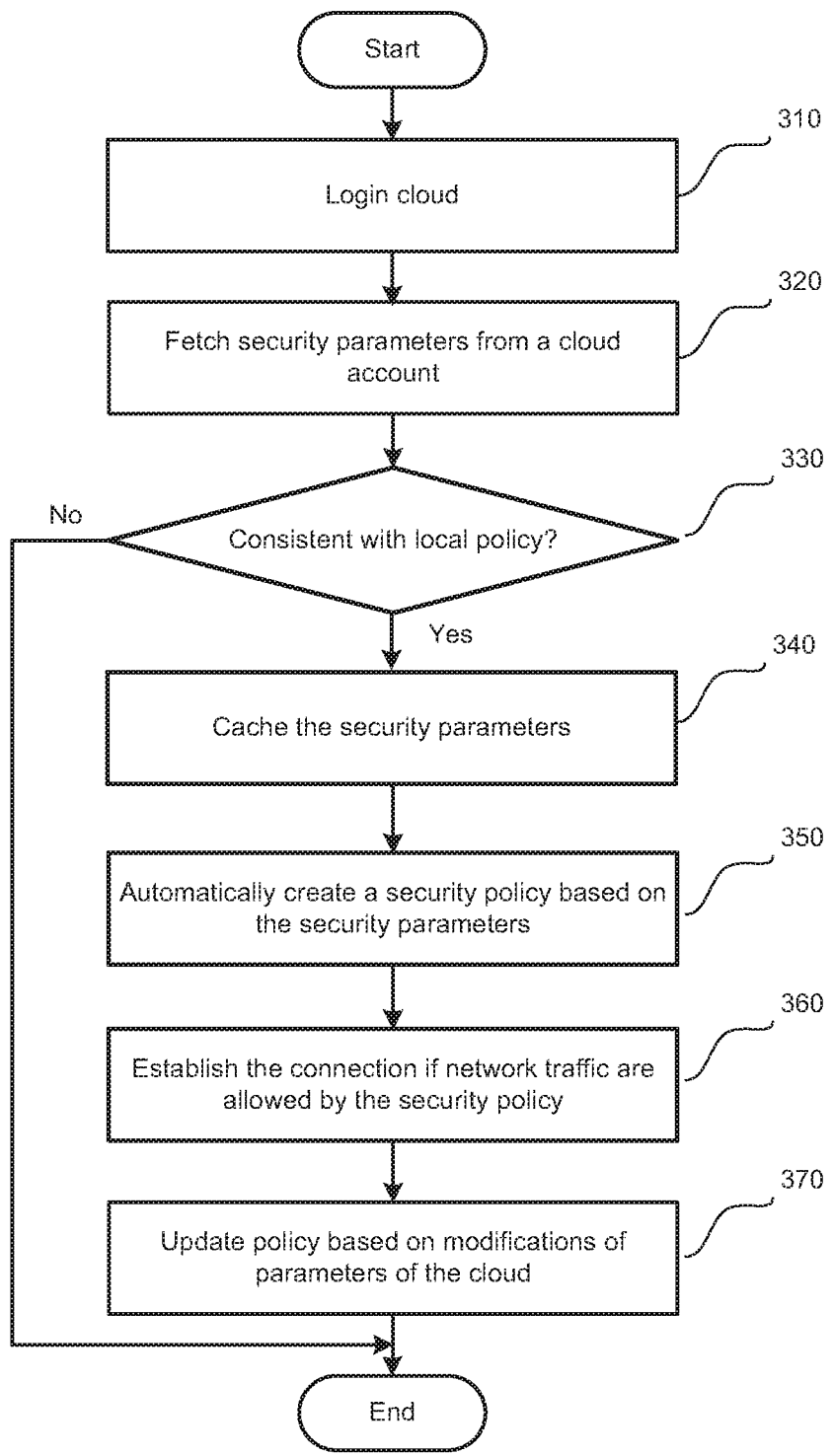
FIG. 3 is a flow diagram illustrating a cloud-based security policy configuration process in accordance with an embodiment of the present invention.

FIG. 3 is a flow diagram illustrating a cloud-based security policy configuration process in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 310, a firewall logs in to a cloud account so that it can share its security parameters with other firewalls and/or retrieve parameters shared by other network appliances within other networks. In one embodiment, each firewall of the same entity can log in to the cloud with the same account, such as "admin@abc.com", while firewalls of different entities can log in to the cloud with different account, such as "admin@partner.com". In another embodiment, each firewall can login with a unique account.

In one embodiment, logging in to the cloud account can be done once the firewalls boot up or at the time when traffic is arriving. Further, the firewall may send a keepalive command to the cloud so that the cloud account is always online. This will help the firewalls to randomly check the cloud table when traffic arrives or periodically check the updates of security parameters in cloud table.

At block 320, the firewall fetches security parameters that are shared by network appliances from the cloud. In one embodiment, parameters shared by all the security devices at the cloud can be fetched. For example, all the content of Table 1 can be fetched by the firewall. In another embodiment, only the part of parameters that is shared to the firewall is fetched. For example, only records that have the account id admin@abc.com in the "shared-to" column can be fetched.

At block 330, the firewall can perform a consistency check against a local rule. If the security parameters shared by the other network is allowable according to the local rule, then the security policy can be created based on these security parameters.

In one embodiment, the cloud table is initially created and updated under the control of the firewall. At an initial stage, each firewall may shares its initial security parameters, such as gateway IP and subnet, to the cloud but does not allow any external access. After the initial security parameters of other networks are fetched from the cloud, the local firewall compares all the viewable networks with its local rule. If a viewable network matches with a local rule, it means that a remote network shares its resource while the local network accepts this sharing. In other embodiments, a list of viewable networks can be shown to the network administrator, and the allowed networks can be selected by the administrator from the list. It can be seen from Table 6, branch office networks 1-3 share their resources to remote networks.

However, the local administrator (here, the administrator of headquarters network) can select only branch office networks 1 and 2 to be allowed.

Next, the firewall updates "share-to-account" and "share-to-subnet" columns of the cloud table by the matched or selected networks and subnet thereof. After every security device of the network finished the consistency checking and updated the cloud table, Table 6 becomes Table 1.

At block 340, the firewall can cache the fetched parameters locally. To simplify the management, one or more local tables can be created. In one embodiment, four local tables, i.e. "share" table, "viewable" table, "access to" table and "allowed in" table are created and the cloud table can be split and cached in the corresponding local tables. Although four local tables are listed in above embodiment, those skilled in the art will appreciate that a local table can be the same as the cloud table or be split to other number of tables depend on local settings.

At block 350, the firewall can automatically create a security policy that controls the connection between local networks and remote networks based on the parameters of the cloud table or local table. In one embodiment, the firewall may also create firewall address objects based on the parameters of the cloud table or local table. The security policies may include following items:

Police Headquarter->Branch1:
  source interface: internal
  destination interface: wan1
  source address: HQ_Net
  destination address: Branch_Net1
  Action: IPSec VPN
  Service: any Police Headquarter->Branch2:
  source interface: internal
  destination interface: wan1
  source address: HQ_Net
  destination address: Branch_Net2
  Action: IPSec VPN
  Service: any At block 360, the firewall can establish a connection between the local network and remote network if network traffic is allowed by the security policy. In one embodiment, when the firewall receives a traffic coming from its local network (10.10.10.0/24) to a destination (192.168.1.0/24), a serial of firewall policies will be checked. When the automatically created policy "Police Headquarter->Branch1" is matched, the firewall further checks the cloud table to determine if the traffic is allowable and how to establish the connection. Of course, if the cloud table is cached locally, local table, instead of the cloud table, can be used.

Next, the firewall can retrieve the rows in which "Subnet" is the destination (192.168.1.0/24) from the cloud table. Then, "Share-to-Subnet" column of the retrieved rows is checked to verify if it contains source subnet 10.10.10.0/24. If "Share-to-Subnet" column does not contain subnet 10.10.10.0/24, it means that the traffic is not allowed by the remote network. Then, the traffic is denied. If "Share-to-Subnet" column does contain subnet 10.10.10.0/24, the firewall can retrieve the gateway IP address of the remote (172.20.120.200) at column "Gateway IP". The firewall also retrieves VPN parameters if VPN is need for the traffic. Then, the firewall initiates IPSec tunnel request to "Gateway IP" (172.20.120.200). The destination network receives the VPN request and checks VPN initiator's IP (172.20.120.122) in cloud table. When the destination network finds out that the VPN initiator's IP is in its "shareto-account" of the cloud table, A VPN tunnel can be setup between the two firewalls. When the VPN tunnel is setup, the traffic will flow through.

At block 370, the firewall can update its parameters in the cloud table if the parameters have been changed locally. For example, the "Gateway IP" may be assigned by a DHCP server and may be changed after some times. The "subnet" is also changed when some resources of a local network are newly allowed/disallowed to be shared according to the local rule. When these parameters are changed, both local table and cloud table should be updated.

Further, the firewall can check the updates in the cloud table periodically or at the time when traffic is arriving. If any parameter in the cloud table is updated by other networks, the firewall can synchronize it with its local table. The firewall can automatically create a new security policy or update or delete the previously created security policy according to the updates of the parameter.

Figure 4:
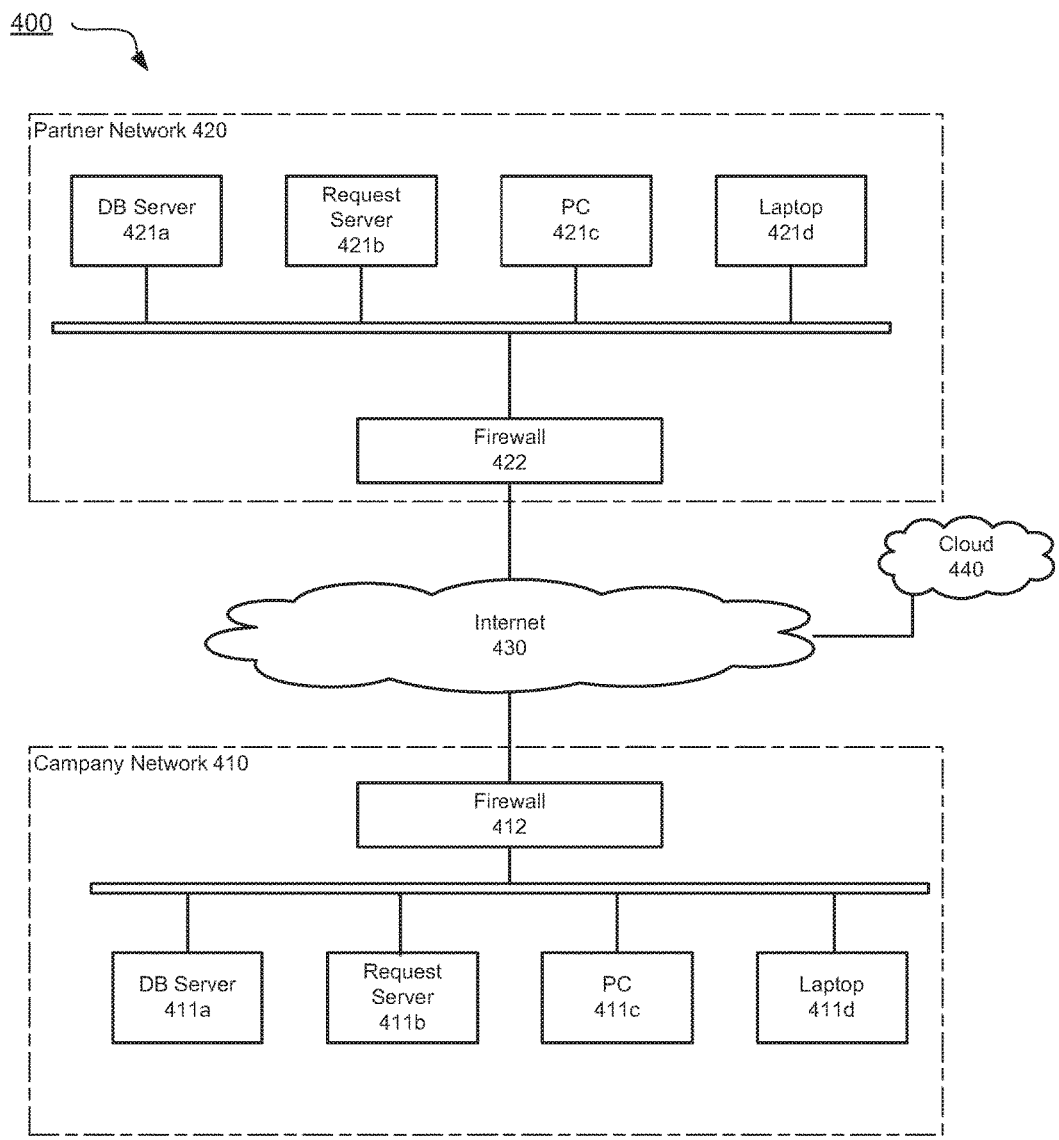
FIG. 4 illustrates an exemplary network architecture in accordance with another embodiment of the present invention.

FIG. 4 is an exemplary network architecture conceptually illustrating a network system 400 having a company network 410 and a partner network 420. Both the company network 410 and the partner network 420 are connected to the Internet 430. A cloud 440 is also connected to the Internet 430 and cloud 440 can be accessed by the network appliances of company network 410 and partner network 420 via the Internet 430.

In the context of the present example, company network 410 includes computing devices such as database server 411a, request server 411b, PC 411c and laptop 411d. Company network 410 also includes a firewall 412 that may operate as a router and network security or access control mechanism and which may be configured to shield data and resources from computer network intruders and create an electronic boundary that prevents unauthorized users from accessing files or other content on a network or a computing device. In one embodiment, computing devices 411a-d are connected via wired or wireless connections to the firewall in order to access the Internet 430, cloud 440 or partner network 420. Similarly, partner network 420 includes computing devices such as database server 421a, request server 421b, PC 421c and laptop 421d. Partner network 420 also includes a firewall 422 and computing devices 421a-d are connected via wired or wireless connections to the firewall 422 in order to access the Internet 430, cloud 440 or company network 410.

According to one embodiment, some computing devices, such as DB server 411a and request server 411b, are allowed to be access from PC 421c and laptop 421d of the partner network 420. A connection between the company network 410 and the partner network 420 is established without a VPN tunnel. The procedures to automatically establish security policies and connections based on parameters fetched from the cloud are the same as those described in connection with FIG. 1, except that no VPN parameters are necessary and no VPN tunnel is setup.

Figure 5:
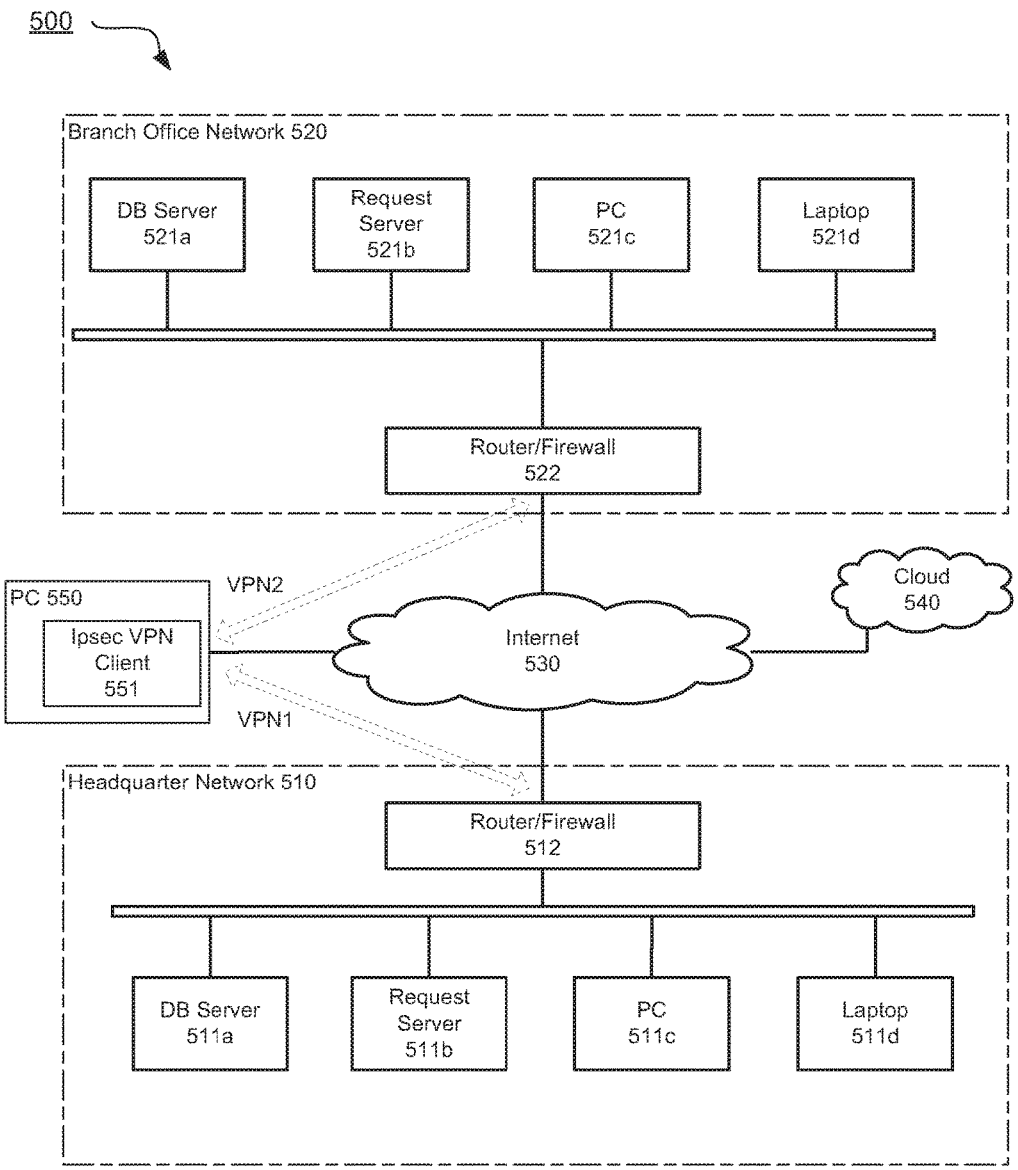
FIG. 5 illustrates an exemplary network architecture in accordance with yet another embodiment of the present invention.

FIG. 5 is an exemplary network architecture conceptually illustrating a network system 500 having a headquarters network 510 and a branch office network 520. Both headquarters network 510 and branch office network 520 are connected to the Internet 530. A cloud 540 is also connected to the Internet 530 and cloud 540 can be accessed by the network appliances of headquarters network 510 and branch office network 520 via the Internet 530.

In the context of the present example, the headquarters network 510 includes computing devices such as database server 521a, request server 521b, PC 521c and laptop 521d. Headquarters network 510 also includes a firewall 512 that may operate as a router and network security or access control mechanism and which may be configured to shield data and resources from computer network intruders and create an electronic boundary that prevents unauthorized users from accessing files or other content on a network or a computing device. In one embodiment, computing devices 521a-d are connected via wired or wireless connections to the firewall in order to access the Internet 530, the cloud 540 or the branch office network 520. Similarly, the branch office network 520 includes computing devices such as database server 521a, request server 521b, PC 521c and laptop 521d. Branch office network 520 also includes a firewall 522 and the computing devices 521a-d are connected via wired or wireless connections to the firewall 522 in order to access the Internet 530, the cloud 540 or the company local network 520. A computer 550 which is outside headquarters network 510 and branch office network 520 is configured to access these networks through an IPSec VPN client 551.

According to one embodiment, headquarters network 510 and branch office network 520 share their respective gateway, subnet and VPN dialup parameters to cloud 540. A cloud table, such as Table 7, can be created. Headquarters network 510 and branch office network 520 may then automatically create their security policies.

TABLE 7

| Account | Gateway IP | Subnet | Description | VPN-parameters | Share-to-Account | Share-to-Subnet |
| --- | --- | --- | --- | --- | --- | --- |
| admin@abc.com | 172.20.120.122 | 10.10.10.0/24 | HQ_Net | dialup, . . . , etc | admin@abc.com | 192.168.1.0/24 |
| admin@abc.com | 172.20.120.200 | 192.168.1.0/24 | Branch_Net | dialup, . . . , etc | admin@abc.com | 10.10.10.0/24 |

Next, when computer 550 needs to setup a VPN connection to any local networks 510 or 520, IPSec VPN client 551 logs into cloud 540 with account admin@abc.com. Then IPSec VPN client 551 fetches the cloud table and dials up to the corresponding Gateway IP using the dialup parameters. Then a VPN1 or VPN2 can be setup between computer 550 and the local network 510 or 520. With the help of cloud 540, IPSec VPN client 551 can automatically and dynamically configure and setup a VPN tunnel to a remote network. If the parameters have been changed on the remote network side, the updated parameters can be shared via cloud 540. IPSec VPN client 551 does not need amend its setting manually.

According to one embodiment, an SSL VPN client (not shown) can also use parameters shared by a remote network on cloud 540 to setup a tunnel. The procedures for configuring and setup of SSL VPNs on the client side and firewall side are the same as that described with reference to an IPSec VPN, except the VPN-parameters are for an SSL VPN. If the parameters have been changed on the remote network side, the updated parameters can be shared on the cloud. The SSL VPN client does not need amend its setting manually.

Figure 6:
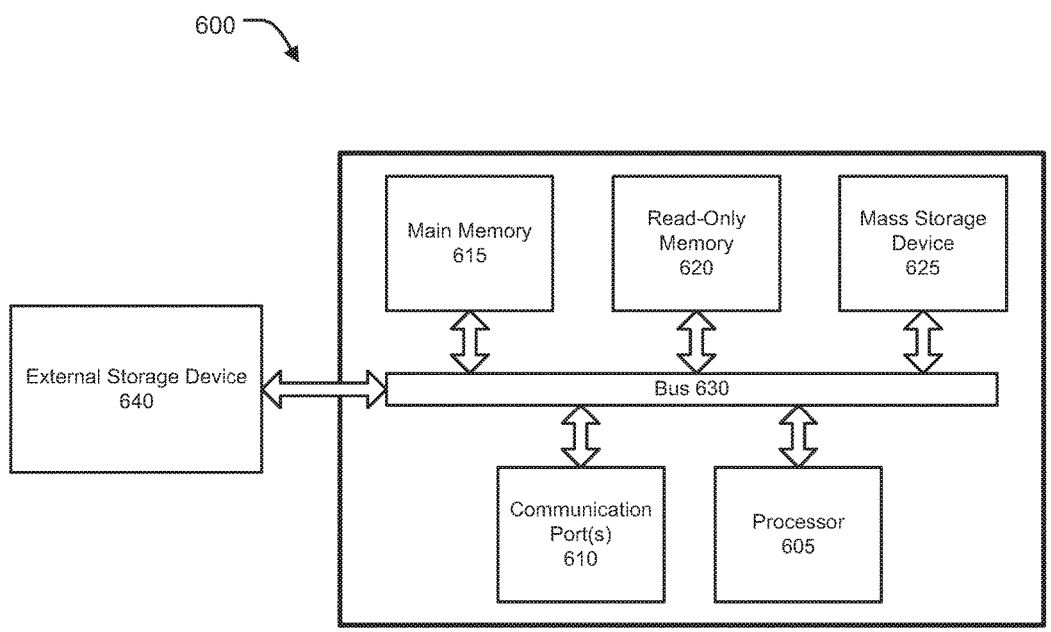
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network appliance (e.g., firewall 114 or switches 106*a-b*), a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with monitoring unit as described in FIG. 2. Processor 605 may include parameter fetching module 220 for fetching parameters shared by other networks. Processor 605 may further include policy creating module 250 for automatically creating a security policy based on the parameters of the cloud table. In addition, processor 605 may include consistency checking module 230 for checking the fetched parameters with a local rule. Processor 605 may include login module 210 for establishing communication with a cloud account from the network. Processor 605 may include parameter caching module 240 for caching the fetched parameters locally. Processor 605 may include connection establishing module 260 for establishing a connection between the local network and remote network. Processor 605 may include policy updating module 270 for updating its parameters in the cloud table.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    sharing, by a first network security device of a plurality of network security devices protecting a private network of an enterprise, a plurality of security parameters associated with the first network security device with other network security devices of the plurality of network security devices by logging into a shared enterprise cloud account, wherein the private network includes a first local area network (LAN) servicing a first site of the enterprise and a second LAN servicing a second site of the enterprise, wherein the first LAN is coupled in communication with the second LAN via a public network, wherein the first network security device provides security services for the first LAN;
    retrieving, by a second network security device of the plurality of network security devices, the plurality of shared security parameters by logging into the shared enterprise cloud account, wherein the second network security device provides security services for the second LAN;
    automatically creating, by the second network security device, a Virtual Private Network (VPN) client configuration that controls a VPN connection between the first network security device and the second network security device based at least in part on the plurality of shared security parameters; and
    dynamically establishing the VPN connection between the first network security device and the second network security device based at least in part on the plurality of shared security parameters.

2. The method of claim 1, wherein said automatically creating a security policy comprises determining, by the second network security device, whether the plurality of shared security parameters are allowable by performing a consistency check of the plurality of shared security parameters against a local rule.

3. The method of claim 1, further comprising locally caching, by the second network security device, the plurality of shared security parameters.

4. The method of claim 1, wherein the plurality of shared security parameters include one or more of information regarding a share-account, a gateway Internet Protocol (IP) address, a subnet, a VPN mode, a VPN authentication method, a VPN pre-shared key, a VPN certificate, a share-to-account and a share-to-subnet.

5. The method of claim 1, wherein the first network security device comprises one or more of a unified threat management (UTM) appliance, a VPN appliance and a firewall.

6. The method of claim 1, wherein the first network security device is physically located at the first site.

7. The method of claim 1, wherein the second network security device is physically located at the second site.

8. A network security device comprising:
  non-transitory storage device having embodied therein instructions representing a security application; and
  one or more processors coupled to the non-transitory storage device and operable to execute the security application to perform a method comprising:
    retrieving a plurality of security parameters shared by a second network security device of an enterprise to a shared enterprise cloud account by logging into the shared enterprise cloud account;
    based at least in part on the plurality of shared security parameters, automatically creating a Virtual Private Network (VPN) client configuration associated with a VPN connection between the network security device, which is within a first local area network (LAN) of a private network of the enterprise that services a first site of the enterprise, and the second network security device, which is within a second LAN of the private network that services a second site of the enterprise, wherein the first LAN and the second LAN are coupled in communication via a public network with a second LAN of the private network servicing a second site of the enterprise; and
    dynamically establishing the VPN connection between the network security device and the second network security device based at least in part on the plurality of shared security parameters.

9. The network security device of claim 8, wherein said automatically creating a security policy comprises determining whether the plurality of shared security parameters are allowable by performing a consistency check of the plurality of shared security parameters against a local rule.

10. The network security device of claim 8, wherein the method further comprises locally caching the plurality of shared security parameters.

11. The network security device of claim 8, wherein the plurality of shared security parameters include one or more of information regarding a share-account, a gateway Internet Protocol (IP) address, a subnet, a VPN mode, a VPN authentication method, a VPN pre-shared key, a VPN certificate, a share-to-account and a share-to-subnet.

12. The network security device of claim 8, wherein the network security device comprises one or more of a unified threat management (UTM) appliance, a VPN appliance and a firewall.

13. The network security device of claim 8, wherein the network security device is physically located at the first site.

14. The network security device of claim 8, wherein the second network security device is physically located at the second site.

* * * * *